United States Patent [19]

Hilton et al.

[11] Patent Number: 5,247,631
[45] Date of Patent: Sep. 21, 1993

[54] PROGRAMMABLE CONTROL OF EMS PAGE REGISTER ADDRESSES

[75] Inventors: William K. Hilton, Phoenix; Charles R. Rimpo, Mesa, both of Ariz.

[73] Assignee: VLSI Technology, Inc., San Jose, Calif.

[21] Appl. No.: 689,216

[22] Filed: Apr. 22, 1991

[51] Int. Cl.[5] ............... G06F 12/00; G06F 12/02; G06F 12/06; G06F 12/10
[52] U.S. Cl. ............................ 395/400; 395/425
[58] Field of Search ...................... 395/400, 425

[56] References Cited

U.S. PATENT DOCUMENTS

| | | | |
|---|---|---|---|
| 4,926,323 | 5/1990 | Stimac et al. | 395/425 |
| 5,042,003 | 8/1991 | Belt et al. | 395/425 |
| 5,123,098 | 6/1992 | Gunning et al. | 395/400 |
| 5,146,580 | 9/1992 | Naidu et al. | 395/425 |
| 5,161,218 | 11/1992 | Catlin | 395/425 |
| 5,175,830 | 12/1992 | Sherman et al. | 395/400 |

OTHER PUBLICATIONS

"Expanded Memory: Writing Programs that Break the 640K Barrier", Hansen et al, Microsoft Systems Journal, vol. 2, No. 1, Mar. 1987, pp. 21–32.

"Understanding Expanding Memory Systems" in *The Waite Group's MS—DOS Papers for MS–DOS Developers and Power Users*, Howard W. Sams Company, 1988, pp. 532–562.

*Primary Examiner*—Joseph L. Dixon
*Assistant Examiner*—Michael A. Whitefield
*Attorney, Agent, or Firm*—LaValle D. Ptak

[57] ABSTRACT

A hardware system provides a programmable method for addressing expanded memory specification (EMS) registers in a personal computing system functioning with an MS-Dos ® operating system or the like. The system provides hardware flexibility for addressing EMS registers at different addresses than the standard LIM EMS specification calls for, to permit utilization of register addresses in otherwise unavailable locations. The address translations are effected through hardware; so that no additional delays in the circuit operation occur.

6 Claims, 4 Drawing Sheets

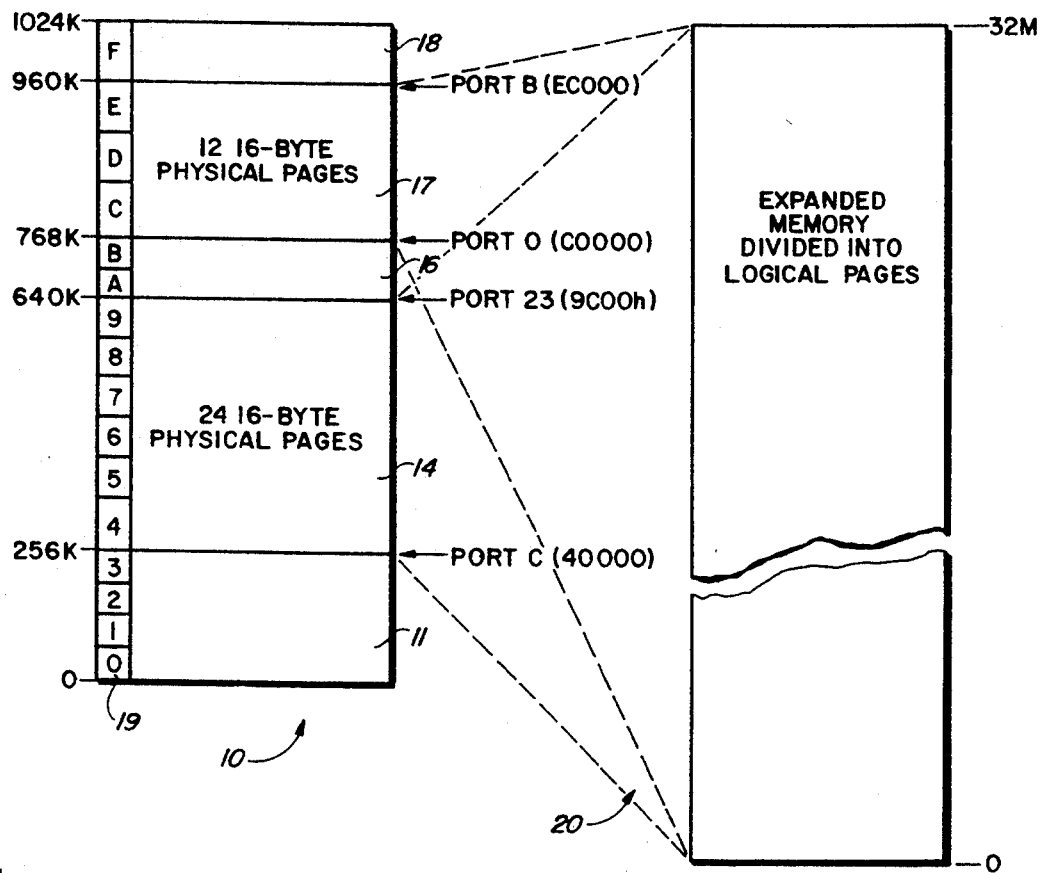

| DATA PORT MAP | | | | | | | | | | | | | | | | | |
|---|---|---|---|---|---|---|---|---|---|---|---|---|---|---|---|---|---|
| DATA PORT | PAGE SEGMENT | DATA PORT EBh | | | | | | | | DATA PORT EAh | | | | | | | |
| | | D15 | D14 | D13 | D12 | D11 | D10 | D9 | D8 | D7 | D6 | D5 | D4 | D3 | D2 | D1 | D0 |
| 0 | C0/A0 | ↑ | ↑ | ↑ | ↑ | ↑ | ↑ | ↑ | ↑ | ↑ | ↑ | ↑ | ↑ | ↑ | ↑ | ↑ | ↑ |
| 1 | C4/A4 | | | | | | | | | | | | | | | | |
| 2 | C8/A8 | | | | | | | | | | | | | | | | |
| 3 | CC/AC | | | | | | A24 | | | | | | | | | | |
| 4 | D0000 | | | | | | | | | | | | | | | | |
| 5 | D4000 | | | | | | | A23 | | | | | | | | | |
| 6 | D8000 | | | | | | | | | | | | | | | | |
| 7 | DC000 | | | | | | | | A22 | | | | | | | | |
| 8 | E0/B0 | | | | | | | | | | | | | | | | |
| 9 | E4/B4 | | | | | | | | | A21 | | | | | | | |
| A | E8/B8 | | | | | | | | | | | | | | | | |
| B | EC/BC | | | | | | | | | | A20 | | | | | | |
| C | 40000 | | | | | | | | | | | | | | | | |
| D | 44000 | | | | | | | | | | | A19 | | | | | |
| E | 48000 | | | | | | | | | | | | | | | | |
| F | 4C000 | | | | | | | | | | | | A18 | | | | |
| 10 | 50000 | | | | | | | | | | | | | | | | |
| 11 | 54000 | | | | | | | | | | | | | A17 | | | |
| 12 | 58000 | | | | | | | | | | | | | | | | |
| 13 | 5C000 | | | | | | | | | | | | | | A16 | | |
| 14 | 60000 | | | | | | | | | | | | | | | | |
| 15 | 64000 | | | | | | | | | | | | | | | A15 | |
| 16 | 68000 | | | | | | | | | | | | | | | | |
| 17 | 6C000 | | | | | | | | | | | | | | | | A14 |
| 18 | 70000 | | | | | | | | | | | | | | | | |
| 19 | 74000 | | | | | | | | | | | | | | | | |
| 1A | 78000 | | | | | | | | | | | | | | | | |
| 1B | 7C000 | | | | | | | | | | | | | | | | |
| 1C | 80000 | | | | | | | | | | | | | | | | |
| 1D | 84000 | | | | | | | | | | | | | | | | |
| 1E | 88000 | | | | | | | | | | | | | | | | |
| 1F | 8C000 | | | | | | | | | | | | | | | | |
| 20 | 90000 | | | | | | | | | | | | | | | | |
| 21 | 94000 | | | | | | | | | | | | | | | | |
| 22 | 98000 | | | | | | | | | | | | | | | | |
| 23 | 9C000 | ↓ | ↓ | ↓ | ↓ | ↓ | ↓ | ↓ | ↓ | ↓ | ↓ | ↓ | ↓ | ↓ | ↓ | ↓ | ↓ |

*FIG. 4*

PROGRAMMABLE CONTROL OF EMS PAGE REGISTER ADDRESSES

BACKGROUND

At the time of the initial introduction of personal computers or micro-computers, the central processing units (CPUs) had a relatively small amount of memory, 16 Kilobytes (16K) in them. Even so, a relatively large number of applications were developed for these computers. Shortly after the introduction of these earliest units, a significantly expanded 8 Bit processor was developed and widely sold, offering 64K of addressable memory. Many software packages were developed for these micro-processors, and effective office automation was under way.

The next major development came from IBM Corporation in the form of a personal computer with ten times this 64K system memory. An operating system known as MS-DOS ® also was introduced to take advantage of the capabilities of the micro-processor chips used in these personal computers. The processor used in these early personal computers had 20 address lines. These 20 address lines permit access to one Megabyte (1M) of memory. This is one million bytes (2 to the twentieth power). The MS-DOS ® operating system was written with this 1 Megabyte limitation in mind. These computers were capable of addressing 640K of memory for data processing as accessible memory, with the remaining memory being reserved for future functions.

In the mid 1980's, some computers were introduced which employed a micro-processor which had, among other improvements, 24 address lines, creating an address access of 16M (2 to the 24th power). Memory chip manufacturers also have continued to reduce the cost of the memory chips (DRAMS); so that increasingly larger memories are economically feasible for personal computer users.

In addition, however, increasingly sophisticated software was written, which required increasing amounts of the available system memory for applications approaching those which previously ran only on much larger mainframe computers or mini-computers. Such sophisticated software, such as the Lotus 1-2-3 ® spreadsheet program, consumed so much of the available 640K memory limit that a solution for increasing the available system memory was required. One solution, which has been utilized to some extent, was the development of different "protected mode" operating systems, such as UNIX ®, XENIX ®, and, most recently, the IBM operating OS/2 ®.

MS-DOS ® is not compatible with these protected mode operating system, however, since it operates with its original 1-Megabyte limit, and has no capability for utilizing memory beyond this limit. Because of the extremely large numbers of highly popular personal computers using MS-DOS ® operating software, and, also, because of the large number of software applications developed to work with this operating system, a change to a different industry operating system, to take advantage of increased memory capacity, has not proven to be a desirable approach.

In an effort to overcome the MS-DOS ® limitation, three major companies, Lotus ®, Intel ®, and Microsoft ®, (LIM) joined forces to develop the Expanded Memory Specification (EMS) board. The EMS board expands memory by creating a 192K window in a space between the original 640K limit and 1M of the 1M memory recognized by MS-DOS ®. It should be noted that the address space above 640K was divided into six 64K slices, or equal portions of memory. These slices or memory portions are referred to in personal computing literature as A, B, C, D, E, and F for their hexadecimal representations. Similarly, the hexadecimal representations of the memory from 0K to 640K are divided into ten 64K slices or memory chunks represented by hexadecimal representations 0 through 9. By way of example, the hexadecimal representation A refers to the 64K slice of memory with the 24 Bit address A0000h (where h indicates a hexadecimal number).

The six slices of memory above 640K originally were reserved for various functions. The slice at F, for example, is reserved for BIOS ROM, with video adapters and other interface adapters going into the other slices, A, B, C, D, and E (if such peripherals are present in the specific system being operated).

EMS is designed to use three of these 64K memory slices (C, D, and E) for translating addresses below 1M into memory above 1M. This is accomplished, essentially, by taking an idle slice of memory above the 640K limit and using it as a window to "page" out to more memory. Currently, a system known as EMS 4.0 or LIM 4.0 operates to access up to 32M of memory, employing the same general techniques used in the original EMS specification. Currently, EMS defines 36 registers, each of which points to a 16K space. There are four registers in each of the three 64K slices. These are addressed, for example, for the hexadecimal "C" slice, as C 0XXX, C 4XXX, C 8XXXh, and CCXXXh. Similar addresses are used for the D and E slices. In addition, there are 24 registers located in RAM between 256K and 640K addresses 4 to 9. If EMS is used, these 24 registers also may be loaded with values that point to memory above 1M, for a total of 36 possible EMS addresses.

A problem exists, however, in the universal application of the EMS system defined generally above. In many applications, where customers desire to expand the memory of their systems, software drivers already are located in some of the spaces capable of use by EMS. For example, frequently, software drivers are located in the C, D, and E spaces. If EMS systems are to be used in computers which already have drivers located in these spaces, modification of the existing software is necessary before the EMS system can be utilized. The reinstallation of software in different memory slices or physical pages of memory is not something to be undertaken lightly, and many customers do not wish to modify software which already has been installed in these locations.

It is desirable to provide the capability of re-defining the location of EMS registers through hardware implementation at the option of the user, without modifying or relocating existing software located in memory locations normally used by EMS.

SUMMARY OF THE INVENTION

The addressing of EMS registers is expanded by a programmable gating network to translate the EMS registers to access them at locations other than the conventional locations. This translation is effected by means of a configuration register signal, and by means of hardware implementation; so that no operating delays are introduced into the system operation.

BRIEF DESCRIPTION OF THE DRAWINGS

FIG. 1 diagrammatic representation of an expanded memory system of the type used with a preferred embodiment of this invention;

FIGS. 2 and 3 are charts employed in understanding of the EMS page register mapping of a preferred embodiment of the invention;

FIG. 4 is a data port map useful in describing the operation of the preferred embodiment of the invention.

DETAILED DESCRIPTION

Figure 5A:
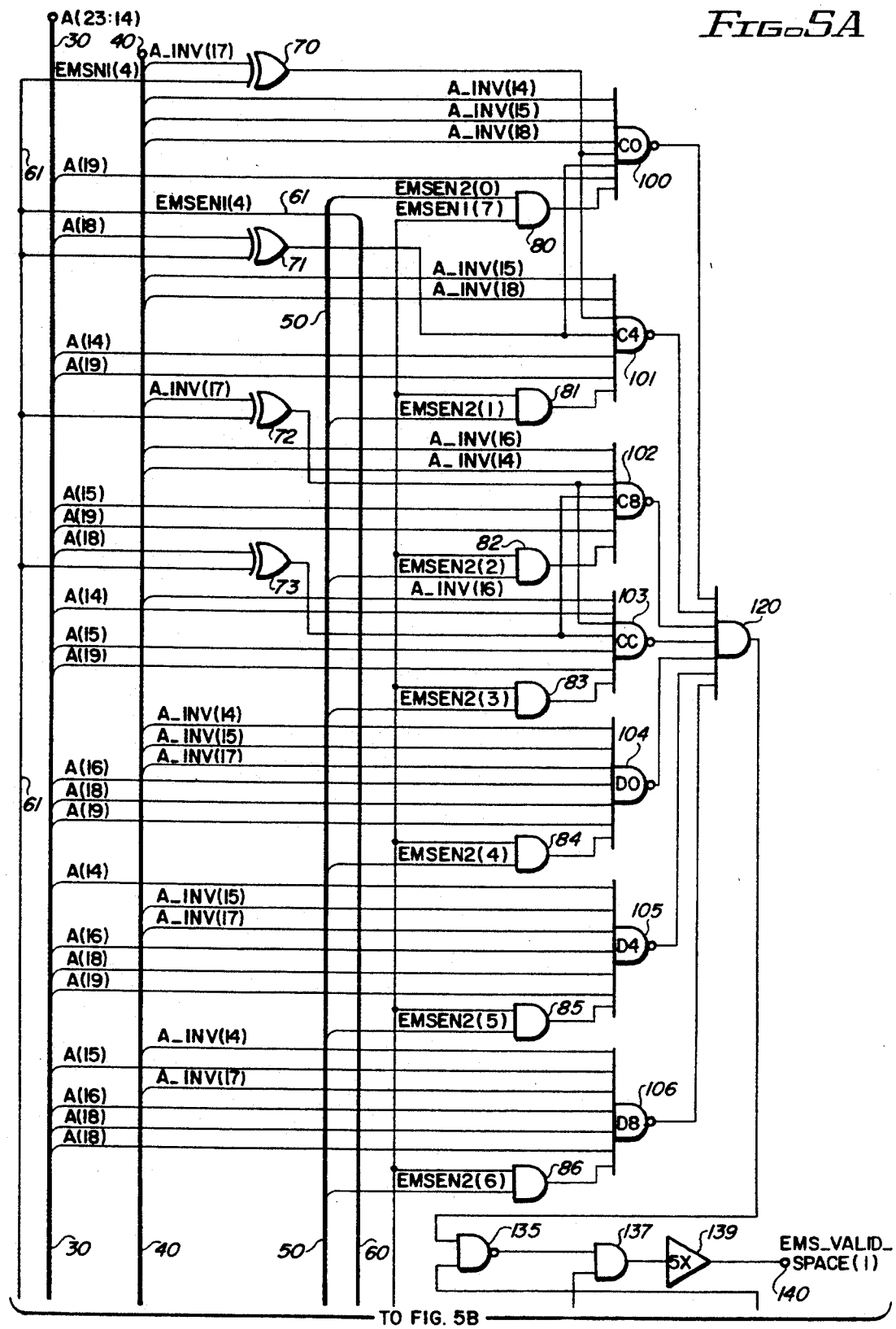
FIGS. 5A and 5B are a schematic circuit diagram of a preferred embodiment of the invention.

Reference now should be made to the drawings in which the same reference numbers are used in the different figures to designate the same or similar components. FIG. 1 is a diagrammatic representation of the partitioning of a standard PC micro-processor 1 Megabyte (1M) memory 10, with an indication of the expanded memory capability to an additional 32 or 64 Megabytes (32 or 64M) 20 which may be effected by a preferred embodiment of this invention.

The standard 1M memory with which MS-DOS® has been designed and forming the limitation of the MS-DOS® operating program, is shown as the 1 Megabyte memory block 10 (actually 0 to 1024K of memory). This memory typically is organized into different 64K slices or sections, in five major memory groups 11, 14, 16, 17, and 18. These "groups" of 64K slices or memory chunks are not equal in size. For example, from 0K to 256K comprises a memory section 11 where DOS is loaded, along with other application programs. The next section 14, from 256K to 640K, includes the standard RAM memory also used for application programs and data. All of the different 64K slices of memory, found in the sections 11, 14, 16, 17, and 18, are referred to by their hexadecimal address representations indicated in the column 19, on the left hand side of the memory 10. In the sections 11 and 14, the ten different 64K slices are represented by the hexadecimal address representations 0 through 9, inclusive.

The next section 16 of the memory 10, is a 128K section represented by the hexadecimal addresses A and B. Address A typically is used for EGA displays, and address B is typically used for video displays (including EGA displays). The next section 17, comprising the 192K portion from 768K to 960K, is represented by addresses C, D, and E. Address C typically includes the XT hard disk ROM, EGA displays, and other designated uses. Address D currently is used for some accelerator cards and EMS translated addresses for standard EMS systems. Address E is dedicated to AT hard disk ROM. The final 64K of the memory 10 is section 18, designated by hexadecimal address F. This slice, from 960K to 1024K, has been reserved for ROM BIOS.

Expanded memory specification (EMS) boards utilize addresses at C, D, and E, in section 17, for the translation of addresses in the memory 10 to reach the expanded memory 20, and the individual logical pages within the memory 20. Since all programs which use expanded memory addressing to reach memory above 1M must run under DOS operating systems, memory limitations still are reached. EMS memory actually depletes or diminishes the available DOS memory in the 1M memory block 10, because the pointers and constants, needed for DOS and the EMS program to retrieve data, use memory in the memory unit 10. Consequently, it is possible to deplete the available DOS memory, even though memory in the expanded memory 20 is available. The reason is that this additional memory 20 cannot be accessed when the DOS memory is used up. This is particularly true of the standard EMS memory addressing at hexadecimal address locations C, D, and E (768K to 960K).

An EMS system for accessing more than twelve 16 byte EMS registers has been developed, which also employs twenty-four 16-byte registers in the RAM space of the memory located between 256K and 640K. This system is called either EMS 4.0 or LIM 4.0. The problem with utilizing these twenty-four registers, located in this portion of the memory, portion 14 of FIG. 1, is that whenever the EMS accessing uses registers in the RAM space, the space which is employed for EMS is not available for other RAM functions. As indicated in FIG. 1, for EMS addressing, these locations or addresses typically are divided into twelve 16-byte physical pages to translate addresses directed to this region of the 1M memory into memory above 1M. Each register or address in this region points to a different 16K space; so that there are four registers in each of the three 64K memory slices or chunks (C, D, and E), as explained previously.

A problem exists, however, because even in this area (768K to 960K) many users already have other software drivers located in the C, D, and E spaces. To overcome the problem of conflict in the EMS designated spaces (C, D, and E in the 768K to 960K portion of the memory 10), the present invention employs a programmable bit in a register to permit the user to redefine the location of the EMS registers. When this programmable bit is set, instead of the EMS registers being accessed at hexadecimal positions C, D, and E, the EMS registers are accessed at hexadecimal positions A, B, and D. Consequently, the user has the option of where to place the EMS registers, replacing registers C and E with A and B, respectively, if desired. Obviously, if the register locations at A and B (640K to 768K) have the space in them committed to other software drivers prior to the EMS bit designations, the relocation or modified allocation of the EMS addressing would not be employed.

Figure 5B:
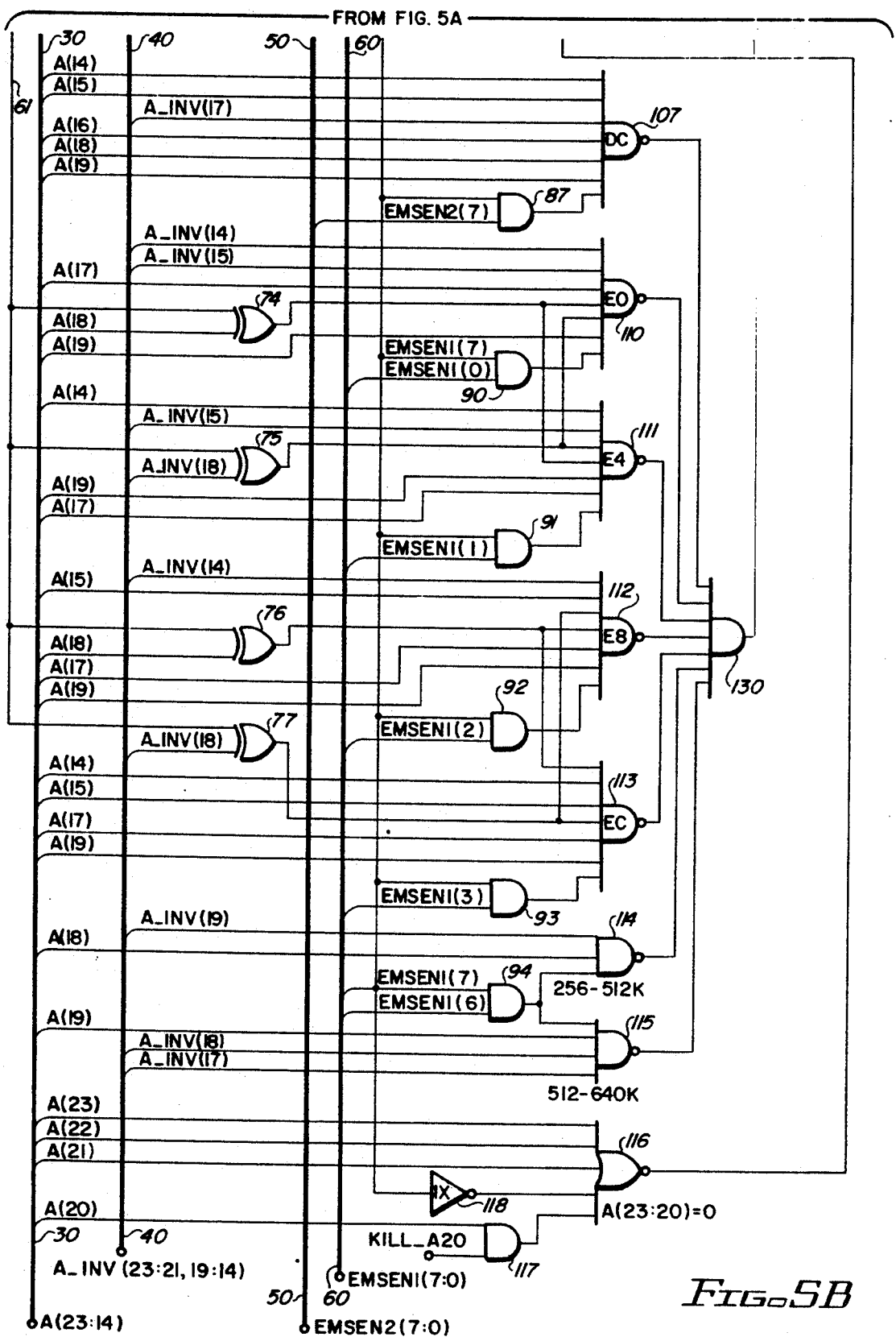

The system to translate EMS addresses is illustrated in the circuit diagram of FIGS. 5A and 5B. The EMS sub-system encoding for the system is shown in FIG. 2. The EMS index register of FIG. 3 and the data port map of FIG. 4 are a programmer's model of the register set which provides flexibility in implementing the EMS specification. The system shown in FIGS. 2 through 5 also permits implementation of all 36 EMS registers without losing any of the RAM between 256K and 640K. If standard implementation of all thirty-six registers in the current EMS 4.0 specification is employed without the system of the preferred embodiment of the invention shown in FIGS. 2 through 5, it is necessary to give up all of the 384K of RAM located in section 14 of the memory 10 shown in FIG. 1. That is avoided by the system of FIG. 5.

Reference now should be made to FIG. 2. This figure illustrates the encoding for the data port EDh of a PC microcomputer. This is read/write data port. The EMS system disclosed in FIGS. 2 through 5 consists of seventy-two mapping registers. These registers are split into a standard set and an alternate set of thirty-six registers each. The alternate register set allows rapid hardware context switching, and the system is capable of translating addresses via the EMS registers over an entire 32M range of possible system board memory.

The EMS system is split into two parts. The first of these is the twelve 16-byte EMS page registers in the range from C0000h to EFFFFh, and the twenty-four backfill (BF) registers which cover addresses 40000h to 9FFFFh. These are the registers shown in section 14 of the RAM of memory 10 of FIG. 1. As shown in FIG. 2, bit D7 of a configuration register EMSEN1 is a global enabler for the EMS page registers. When this bit is a binary "1", the normal twelve 16-byte registers or pages in section 17 (addresses C, D, E) of FIG. 1 are employed. Each of these twelve registers however, can be individually disabled if there are system address conflicts. Bits D0 through D7 of EMSEN2, and bits D0 through D3 or EMSEN1 provide this function.

The 24 EMS backfill registers located in section 14 (addresses 4, 5, 6, 7, 8, 9) of the memory of FIG. 1 are enabled by setting bit D6 of EMSEN1 (FIG. 2). These registers are all enabled or all disabled. No individual control is provided. If a full LIM EMS 4.0 system is desired for a given PC micro-computer, both bits D6 and D7 of EMSEN1 are set, as are the desired EMS page register enable bits. It should be noted that whenever the EMS enable bit D7 is a binary "0" (EMS not enabled), the state of the backfill (BF) enable, bit B6, has no effect on the system, since it is only capable of providing an EMS signal whenever the EMS system as a whole is enabled.

It is important to note that the conventional EMS page register mapping from C0000h to EFFFFh is altered by this system by changing EMSEN1 bit D4 from a binary "0" to a "1". When this occurs, the 12 page registers map to AXXXXh, DXXXXh, and BXXXXh, in that order. The D addresses from 768K to 960K are unchanged. The "C" and "E" addresses, however, have been translated to be addressed instead through the "A" and "B" addresses. In this case, EMSEN1 bits 3 through 0 work to enable or disable the BXXXXh registers, rather than the EXXXXh registers. Similarly, EMSEN2 bits 3 through 0 function to enable or disable the AXXXXh registers rather than the CXXXXh registers. As is clear from FIG. 2, the DXXXXh registers are unaffected by this register translation or mapping.

Consideration of FIG. 2, in conjunction with FIG. 4, the data port map, illustrates the data mapping for the 36 registers of either the standard or alternate sets. FIG. 3 illustrates the encoding which is used at the E8h index port to select which of these two sets of 36 registers (standard or alternate) is to be addressed. This is accomplished by the settings noted in FIG. 3, bit D7. If this bit is a binary "0", the standard set of 36 registers is selected by the data port map of FIG. 4. If this bit is a binary "1", the alternate set of 36 registers addressed by the data port map of FIG. 4 is selected. Bit D6 of the E8h index port is employed to enable or disable an auto incrementing from one register to the next.

Reference now should be made to FIGS. 4 and 5, which illustrate the implementation which is employed by the system to indicate a valid EMS addressing in any of the various locations or translated locations described in conjunction with the sub-system and index register of FIGS. 2 and 3. Obviously, in any system, to recognize an address as an EMS address to an extended memory, such as the memory 20 of FIG. 1, in place of the otherwise standard address within the original 1M memory 10, the address must be uniquely identified as an EMS address, and not as some other type of program address located within the memory 10. This is accomplished by providing a signal on an output terminal 140 (FIG. 5A) each time an address applied to the system constitutes a valid EMS address. The actual address is the same as used with any standard personal computer to access the particular hexadecimal address location within the memory 10. Any of these addresses located in the "backfill" (BF) portion 14, or in the portions 16 and 17 of the memory shown in FIG. 1, however, also can be EMS addresses, as described above.

The computer with which the system is used, operates on these addresses in accordance with standard techniques not important to an understanding of the present system. FIGS. 5A and 5b, together, constitute a single schematic diagram of a logic gate set for producing the indications of valid EMS address signals on the terminal 140 (EMS-Valid-Space). Whenever a signal appears on that terminal, the address sent to a location in memory 10, is translated through the memory 10 to an appropriate page of the expanded memory 20. Thus, if a valid EMS access occurs (that is, the address is in the C-D-E space or the 4 0000h to 9 FFFFh space, with backfill enabled), a signal is produced on the terminal 140; and the data stored in the data port corresponding to the current valid EMS is switched (or multiplexed) out to the memory array 20 as the valid address.

At the bottom of FIG. 5B, four main multiple line bus sets 30, 40, 50, and 60, are shown as extending vertically through both of FIGS. 5B and 5A. Set 30 constitutes system bits A(23:14). Bits 23:14 (23 down through 14, inclusive) are decoded to point to one of the "Data Ports". These bits specifically decode as the "Page Segments" shown in FIG. 4. Similarly, the multiple lines on bus 40 constitute inverted versions of some of the signals appearing on data bus 30, namely, A-INV (23:21, 19:14).

The EMS control signals EMSEN2 (7:0) are shown on input bus 50, and the control signals EMSEN1 (7:0) are shown on control bus 60. These are the same signal sets which are shown in FIG. 2.

An examination of the branches extending from each of these leads or buses 30, 40, 50, and 60 shows, for each of the branches, the individual signals in the various sets which are applied to the different gates in the gating network.

The normal gate designations for the EMS addresses, typically located in the 768K to 960K portion 17 of the memory 10 (C, D, E), are obtained from twelve seven-input NAND gates 100 to 107 and 110 to 113 for addresses C0, C4, C8, CC, D0, D4, D8, DC, E0, E4, E8, EC. The particular address selected is in accordance with the page segment and data port encoding shown in FIG. 4 for these addresses; so that a corresponding one of these gates 100 through 113 is selected for an EMS address to any one of those locations. The encoding for the selection of the particular address may be ascertained from an examination of the state of the input leads connected to each of these respective gates 100 to 113.

This normal EMS address selection is effected by EMSEN1 bit 7 being set to a binary "1". This bit constitutes one of the two inputs to each of twelve AND gates 80 to 87 and 90 to 93, respectively, the outputs of which are respectively connected to one of the inputs of the gates 100 to 107 and 110 to 113. The second input to each of the gates 80 through 93 is from bits 0 through 3 of EMSEN1 and bits 0 through 7 of EMSEN2, as shown, to select the specific one of the 12 physical pages (gates 100 through 113) to which the EMS address is directed. These inputs are all labeled in FIG. 5 by the particular designation of the enabling address selection bit.

Whenever EMSEN1 bit 4 (EMS map in FIG. 2) is changed from a binary "0" to a binary "1", the translation of registers C and E to registers A and B, respectively, is effected. This is accomplished by applying this bit over a lead 61 to control the operation of the exclusive OR gates 70 through 73 and 74 through 77, each of which have outputs connected respectively to the gates 100 through 103 and 110 through 113, to either pass the other bit applied to the input of the exclusive OR gate straight through (standard), or to invert it (alternate) as established by the nature of the mapping bit EMSEN1 (4). Thus, the proper output is applied to the output terminal 140 through the selection gates 100 through 113 automatically, whether the EMS registers are in the conventional locations (C, D, E) or are translated to be accessed at the alternate locations (A, B, D).

As mentioned previously, the individual addresses applied through the data port map of FIG. 4 individually select which of the specific address locations are assigned to EMS access, and which ones are used in a conventional manner within the memory 10.

It should be noted in conjunction with the operation of the system shown in FIG. 5, that to change from address A to C, signal A(18) inverts, and signal A-INV(17) inverts. Similarly, to change from address B to address E, signal A-INV(16) inverts and signal A(18) inverts. Again, this is readily ascertained from an examination of the signals applied to the various logic circuit gates which are used to provide the EMS flag or EMS valid signals to the terminal 140.

As shown in FIG. 5A, the outputs of the NAND gates 100 to 106 all are connected to the input of an AND gate 120, the output of which constitutes one input to a two-input NAND gate 135. Similarly, the outputs of the NAND gates 107 and 110 through 115 are applied to the inputs of an AND gate 130, the output of which constitutes the other input to the NAND gate 135. The gate 135 supplies one of two inputs to an AND gate 137, the other input to which is obtained from a five input NOR gate 116, controlled by bit 7 (the EMS enable) bit from EMSEN1, and bits A 23:20. The output of the gate 137 is buffered by the non-inverting amplifier 139 to provide a signal of proper polarity for recognition of a valid EMS signal on the terminal 140.

The system described above permits the computer user to change the addressing of eight of the twelve registers in the 768K to 960K space, so that they are accessed in a different location. For example, the four registers at 768K to 832K (C) can be accessed, instead, at 640K to 704K (A), and the four registers at 896K to 960K (E) are accessed at 704K to 768K (B). All of this is accomplished by means of a configuration register bit, and the address translations are done entirely in hardware; so that there is no additional delay in the circuit. As is apparent from an examination of FIG. 5, the hardware implementation for providing the EMS-valid signal operates identically, whether the translation of the EMS address registers is changed or is left in the standard EMS configuration.

The foregoing description of the preferred embodiments of the invention should be considered as illustrative only, and not as limiting. Various changes and modifications will occur to those skilled in the art without departing from the true scope of the invention, as defined in the appended claims.

We claim:

1. A system for increasing the flexibility of addressing expended memory specification (EMS) registers in a computer system including in combination:
   means for addressing standard RAM memory registers between 0 and 1 Mb;
   first gate means coupled with said addressing means for translating predetermined addresses to EMS register addresses;
   a plurality of second gates coupled with said first gate means and responsive to control signals applied thereto for changing the addressing of at least some of the standard RAM memory registers addressed by said first gate means;
   control signal supply means coupled with said second gates for supplying said control signals to each of said second gates for changing the addressing of predetermined groups of standard memory registers to EMS registers for accessing said EMS registers at different address locations in accordance with said control signals; and
   wherein said second gates are interconnected with said first gate means specifically for changing the addressing of at least some registers located in the 768 Kilobyte to 960 Kilobyte space for accessing such registers through addresses in the 640 Kilobyte to 768 Kilobyte space of a 1 Megabyte RAM memory.

2. The combination according to claim 1 wherein said second gates comprise two groups of gates, the first group of which changes the addressing of four registers normally addressed at 768 Kilobytes to 832 Kilobytes to access addresses at 640 Kilobytes to 740 Kilobytes, and the second group of which changes the addresses of four registers normally addressed at 896 Kilobytes to 960 Kilobytes to address access at 704 Kilobytes to 768 Kilobytes.

3. The combination according to claim 2 further including bank selection means coupled with said first gate means for causing said system to select one or the other of two banks of EMS registers selected by addresses translated by said first gate means.

4. The combination according to claim 3 wherein said EMS registers are organized as two banks of 36 registers each, with one of said two banks selected by operation of said bank selection means in a first state, and the other of said two banks selected by the operation of said bank selection means in a second state of operation thereof.

5. The combination according to claim 1 further including bank selection means coupled with said first gate means for causing said system to select one or the other of two banks of EMS registers selected by addresses translated by said first gate means.

6. The combination according to claim 5 wherein said EMS registers are organized as two banks of 36 registers each, with one of said two banks selected by operation of said bank selection means in a first state, and the other of said two banks selected by the operation of said bank selection means in a second state of operation thereof.

* * * * *